May 13, 1930.  O. R. COLE ET AL  1,758,029
POLE PLANER
Filed Dec. 28, 1927  2 Sheets-Sheet 1

INVENTORS
O. R. Cole and M. T. Garlinger
BY
ATTORNEY

May 13, 1930. O. R. COLE ET AL 1,758,029
POLE PLANER
Filed Dec. 28, 1927  2 Sheets-Sheet 2

INVENTORS
O.R. Cole and M.T. Garlinger.
BY
J.E. Folk
ATTORNEY.

Patented May 13, 1930

1,758,029

UNITED STATES PATENT OFFICE

ORANGE R. COLE, OF LOS GATOS, AND MARSHALL T. GARLINGER, OF SAN FRANCISCO, CALIFORNIA, ASSIGNORS TO AMERICAN TELEPHONE AND TELEGRAPH COMPANY, A CORPORATION OF NEW YORK

POLE PLANER

Application filed December 28, 1927. Serial No. 243,136.

This invention relates to planers, and more particularly to planers which are adapted for shaving poles and other similar work.

An object of the invention consists of a portable planer having a cutting head provided with knives which rotate at right angles to the pole or other object operated upon to effect the desired shaving, peeling or trimming thereof as the planer is caused to travel along the surface of such object.

Another object consists in the arrangement of the cutting knives to permit cooling thereof between their successive contacts with the pole or other object operated on to prevent the premature temper impairment of said knives.

A further object consists in the provision of a portable planer of the above character which is simple, durable and efficient and which can be manufactured and operated at a comparatively low cost.

These and further objects will be apparent from the following description, when considered in connection with the accompanying drawings in which one embodiment of the invention is illustrated.

Figure 1:
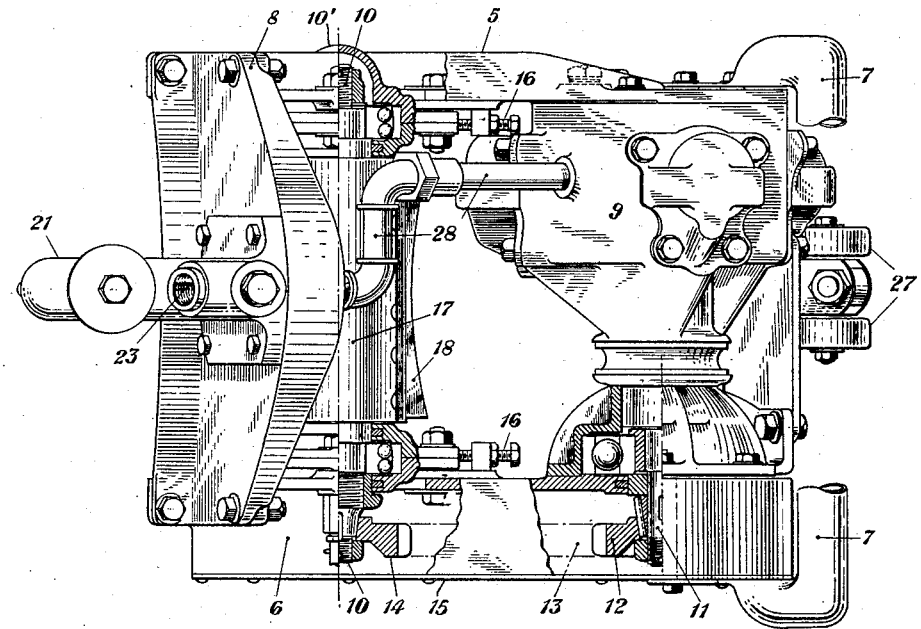
Figure 2:
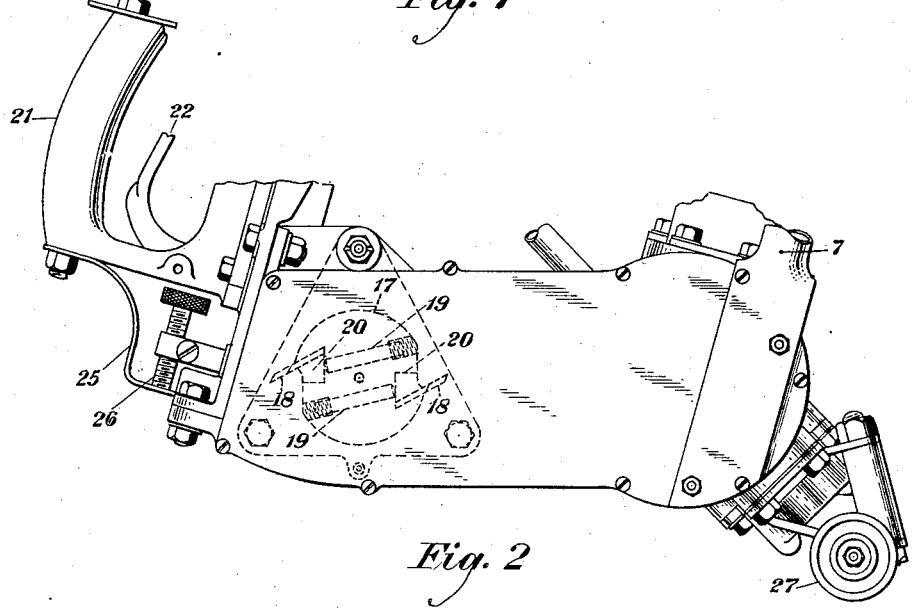
Figure 3:
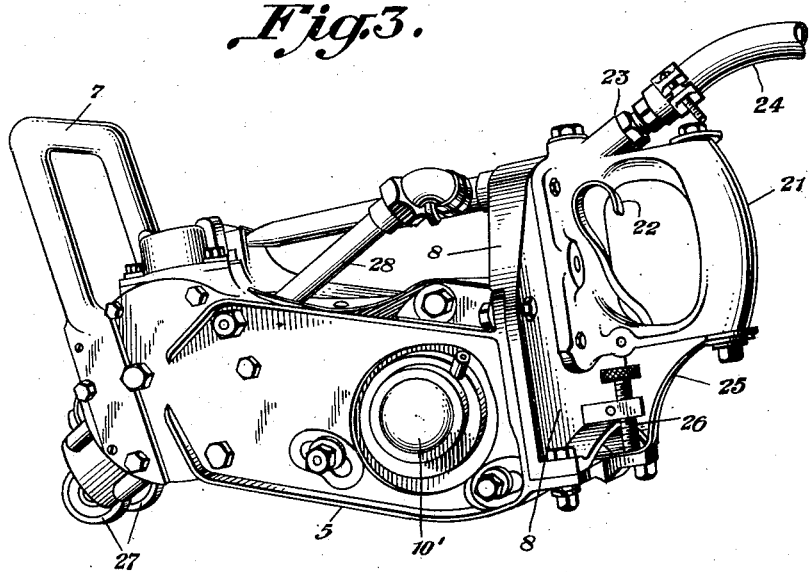
Figure 4:
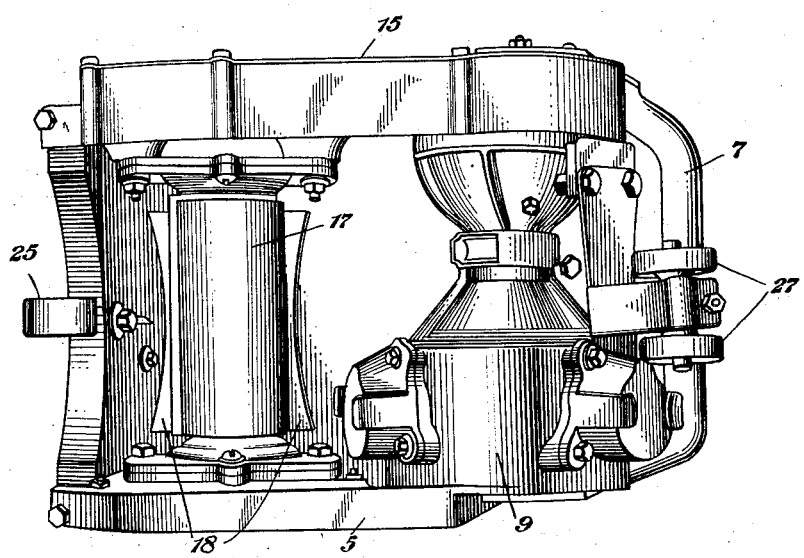

Referring to the drawings, Figure 1 is a top plan view of the improved planer; Fig. 2 is a side elevation of one side of the planer showing certain parts, including the cutting head with its associated knives and a rear handle for the planer; Fig. 3 is a perspective view of the planer; and Fig. 4 is a bottom view of the improved device.

The improved planer is shown in the drawings as comprising a framework or casing consisting of two parallel side members 5 and 6, a front member 7 and a rear member 8. The side member 5 has a motor 9 secured thereto at its forward corner by bolts or the like which extend through the side member 5 and the front member 7. The side member 5 also carries one end of a spindle 10, which forms an axis for a blade-holder to be referred to below. The spindle 10 is journaled in a bearing mounted on triangular shaped plates secured to the casing and is provided with a cap 10' which is suitably attached to said casing to form a covering for the bearing and end of the spindle. The opposite end of the spindle 10 is journaled in a bearing carried by the parallel side member 6. The manner in which the spindle 10 is mounted in the bearings is more clearly indicated in Fig. 1. The front frame member 7, has an upwardly extending portion which may be made of seamless steel tubing, and serves as a handle to facilitate in moving the planer along the surface to be worked upon.

The compressed air motor 9 which may be of any standard type and of suitable capacity is mounted so that its crank-shaft 11 extends in a transverse position with respect to the parallel side members 5 an 6. One end of the shaft is journaled in a bearing in any well known manner within the enclosure provided by a casing for the motor. The opposite end of the shaft is journaled in ball bearings, the cage for which is attached to and suitably supported by the side member 6, such for instance, as illustrated. On the latter end of the crank-shaft 11, a driving sprocket-wheel 12 is mounted, and carries a silent chain 13. The chain 13 engages and operates a driven sprocket-wheel 14, under control of the wheel 12, on one end of the spindle 10 which carries the blade-holder. The chain member 13 may be protected by a guard plate member 15 which also completely encloses the sprocket-wheels 12 and 14. Screws 16, 16 are mounted in studs which are positioned on the side members 5 and 6 and are provided for adjusting the tension in the chain 13. This adjustment is made by moving the cages which carry the bearings for the spindle 10 in a lengthwise direction on the side members 5 and 6.

The blade-holder 17 and its spindle 10 may be integral, and composed of some such suitable material as alloy steel. The blade-holder is of substantially cylindrical form and has two cutting knives 18, 18 attached thereto in lengthwise position. These knives have edges which are of concave shape and substantially conform to the surface of a pole. The cutting knives 18, 18 are positioned in wedge-shaped slots extending longitudinally in the blade-holder, and are spaced thereon at approximately 180° from each other. It will be noted that when the planer is operating, the two cutting knives, which are clamped in the holder, are not in continuous contact with the pole. Thus the temper of the knives is practically unimpaired because they have an opportunity to cool between successive contacts with the pole. The knives 18, 18 are maintained on the holder 17 by means of retaining bolt members 19, 19. The bolt members pass through a series of spaced openings provided longitudinally in the holder and on one side thereof, and engage respective outwardly tapered wedge members 20, 20 positioned in a longitudinal slot at the opposite point in the holder, as more clearly indicated in Fig. 2.

A handle 21 is mounted on the rear frame member 8, with an adjacent throttle lever 22. The lever 22 which may be simultaneously operated with the handle 21 in a trigger like manner, is provided for controlling the supply of compressed air to the motor 9. The casting with which the handle 21 is associated, also provides a threaded connection inlet 23 to which may be attached a hose 24 for delivering compressed air to the planer, as shown in Fig. 3. An adjustable spring guide 25 is attached by means of a bolt to the lower part of the handle and extends beneath the arcuate shaped bottom portion of the rear frame member 8. The spring 25 may be adjusted by a screw 26 which is mounted on a bracket extending from the casing and serves to slidingly carry the rear of the planer along the surface of a pole. The adjusting screw 26 also regulates the engagement of the cutting blades with the pole, by elevating or lowering the planer to vary the depth of the cut in the pole as desired.

On the front end of the planer two small rollers 27, 27 are mounted in parallel relation on a common axis. The support for these rollers may consist of a spindle bolt secured to the front member 7 and the rollers are pivotally associated with the spindle bolt in such manner that they follow along the surface of the pole as for instance in a swivel castor-like fashion. In addition to serving as guides, these rollers also carry the weight of the motor and cooperate with the spring guide 25 positioned at the rear of the planer to facilitate the movement of the planer along the pole.

The hose 24 which is attached to the inlet connection 23 supplies compressed air to the motor 9. This supply is controlled by the throttle lever 22. The air passes from the hose and inlet through a pipe 28 to the compressed air motor, which is operated in a well understood manner.

In the operation of this device, the workman places one hand on the handle 21, and also on the throttle lever 22. The other hand grasps the front handle portion 7. In this position the operator is able to move the machine forwardly and backwardly along the pole. It will be necessary in the operation of the planer to adjust the depth of the blades by altering the adjusting screw 26 to suit conditions.

While the improved planer has been illustrated and described as being operated by a motor of the compressed air type, it will be understood that it may be equally well operated by other forms of motor, such, for instance, as an electric motor.

What is claimed is:

A portable planer for poles and the like comprising framework, a rotatable cutter member mounted in said framework to rotate about an axis parallel to the surface of the object to be planed, blade members having cutting edges of concave form curved to the shape of the poles to be planed and mounted longitudinally in the cutter to project from opposite sides thereof, a wedge member for each blade member mounted longitudinally therewith and so tapered to prevent its outward displacement from the cutter, means extending through said cutter from a point adjacent one wedge member for engaging and maintaining the opposite wedge member in position, a motor mounted in the framework and connected to rotate said cutter member, means adjustably positioned on the front portion of the framework for supporting and guiding the planer, means positioned on the rear portion of the framework cooperating with the last mentioned means to form a sliding support for the planer, a controller handle associated with the framework provided with means for starting and stopping said motor, a second handle whereby the operator by grasping said second handle and said controller handle may move the planer bodily along the surface to be worked upon, and means associated with the rear of the framework for adjusting the depth of cut made by the planer.

In testimony whereof, we have signed our names to this specification this 25th day of November, 1927.

ORANGE R. COLE.
MARSHALL T. GARLINGER.